Patented June 30, 1942

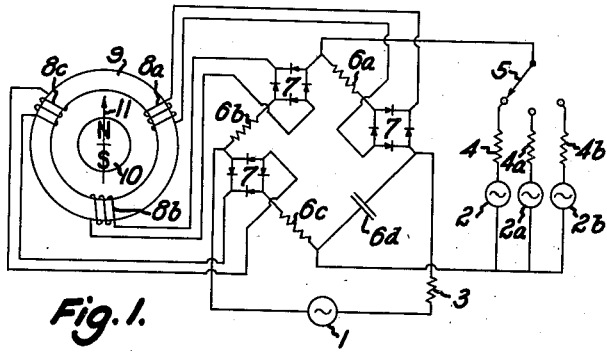

2,288,280

UNITED STATES PATENT OFFICE 2,288,280

SYNCHROSCOPE

Frederick W. Hornbruch, Jr., Roselle Park, N. J., assignor to Weston Electrical Instrument Corporation, Newark, N. J., a corporation of New Jersey Application June 24, 1940, Serial No. 342,152

6 Claims. (Cl. 172—245)

This invention relates to synchroscopes and particularly to synchroscopes for indicating the frequency and phase relations between the alternating current outputs of two generators. The generators may be large units for supplying power to an electrical distribution system or small magnetos of the type used in electric tachometers. The two generators will usually be of identical construction, and thus develop alternating currents of the same frequency when operating at the same speed, but the "in synchronism" indication produced by current outputs of the same frequency may correspond to speed ratios other than unity when the generators are of different design and/or are coupled to their associated engines by different ratio transmission. For convenience of description, it is assumed that the generators are identical and are driven by the engines of a multi-motored aircraft to develop single phase currents of the same frequency when the engine speeds are identical. An indication of the frequency and phase relations between the current outputs of the two generators is therefore an indication of the speed and phase relations between the engines that drive the generators.

An indication of the phase relation between two aircraft engines is desired for the reason that, although both engines may be operating at the same speed, the order of firing may be such that uneven stresses are applied to the aircraft and result in excessive vibration. The pilot can recognize the optimum operating condition for a particular aircraft, and can thereafter establish that condition when the synchroscope indicates the phase relation as well as the speed relation between the two generators.

An object of this invention is to provide an apparatus of simple electrical circuit design for indicating the frequency and phase relations between two single phase alternating current sources. An object is to provide a synchroscope of the type stated that requires no source of power other than the alternating currents developed by the generators. An object is to provide a synchroscope including a bridge network across which two alternating current generators are connected in such manner that the currents in the several network arms periodically reach maximum values in a definite sequence when the generator outputs differ as to frequency, and apparatus with field coils included in a plurality of the network arms to produce a rotating magnetic field that displaces a magnetic pointer in accordance with the speed and direction of rotation of the current maxima values about the bridge network. An object is to provide a synchroscope having an annular iron core carrying at least three spaced windings and a permanent magnet movement pivotally supported within the core to rotate with magnetic fields set up by current flow, a bridge network across which two alternating current generators are connected; three of the side arms of the bridge being resistive and including rectifiers for supplying direct current to the instrument windings, and the fourth arm of the bridge being reactive.

These and other objects and advantages of the invention will be apparent from the following specification when taken with the accompanying drawing in which:

Fig. 1 is a circuit diagram of an embodiment of the invention;

Fig. 2 is a front elevation of the indicating instrument that may be used in the Fig. 1 circuit;

Fig. 3 is a simplified or equivalent circuit diagram showing the current distribution in the bridge arms;

Fig. 4 is a circuit diagram of a synchroscope having half-wave rectifiers in the bridge network; and Figs. 5 and 6 are circuit diagrams of other embodiments of the invention.

In the drawing, the reference numeral 1 identifies the standard or master generator with which one or more secondary generators 2, 2a, 2b, etc., are to be synchronized. The generator 1 is connected across one set of opposed terminals of a bridge network through a current-limiting resistor 3, and the selected secondary generator is connected across the other set of conjugate terminals, through its individual current-limiting resistance 4, 4a, 4b, respectively, by a switch 5. The impedances of three side arms of the bridge are of one type and that of the fourth arm is of a different type. As illustrated, the three similar arms include the resistors 6a, 6b, 6c and the fourth arm comprises the condenser 6d. Rectifiers 7 are included in at least three of the side arms, and preferably in only the three resistive side arms, to supply direct current to the windings 8a, 8b, 8c that are spaced on the annular iron core 9 that is the field structure of the indicating instrument. These windings are elements in three of the side arms and impart an inductive reactance characteristic to those arms while the fourth arm, comprising condenser 6d, has a capacitive reactance characteristic. The movable assembly of the instrument, comprising a permanent magnet 10 and pointer 11, is pivotally supported for free rotation about the axis of the annular field member 9 in response to the magnetic field set up by current flow in the windings.

The instrument per se and also the bridge network may be housed in a cylindrical casing 12, Fig. 2, having an overall diameter of about 2¼ inches and a length of about 2¼ inches, the casing being similar to those now used for the panel mounting of aircraft instruments. The rectifier units 7 for this compact assembly have been small copper oxide rectifier disks in a bridge assembly such as used in the "rectifier" types of alternating current measuring instruments. Appropriate indicia 13, that may be a legend "Fast engine" and arrows extending circumferentially in opposite directions from the legend, are printed or engraved upon a plate 14 that has a small central opening through which the pointer 11 extends.

The method of operation of the synchroscope can be best understood from a consideration of the simplified circuit diagram of Fig. 3. The full-wave rectifier units 7 are not illustrated as they do not affect the alternating current flow through or around the bridge. The bridge network provides two parallel paths for the current flow from each generator, one path including two inductive arms of the bridge, while the other path includes an inductive arm in series with a capacitive arm. At a particular instant when the directions of current flow from generators are as indicated by arrows $a$, $b$, respectively, the generator 1 establishes a current flow through the inductive arms $8b$, $6b$ and $8a$, $6a$ that is indicated by arrows $a_1$, and a current flow through inductive arm $8c$, $6c$ and capacitive arm $6d$ that is indicated by arrows $a_2$; and generator 2 establishes a current $b_1$ in the inductive path comprising windings $8b$, $8c$ and resistors $6b$, $6c$ respectively, and a current $b_2$ in the path comprising, in series, the arm including winding $8a$ and resistor $6a$, and the arm formed by the condenser $6d$. The resultant current flow in the bridge arms is therefore the vectorial sum of the components $a_1+b_2$, $a_1-b_1$, $a_2+b_1$ and $a_2-b_2$, respectively.

A mathematical analysis of the circuit will show that, when the generators 1, 2 develop currents of different frequencies, the resultants of the several current components in the bridge arms combine vectorially to produce a current flow in each arm that varies periodically between a maximum and a minimum value, and a progression of the maximum current value about the bridge arms at a speed equal to the difference in frequency of the two generators, and in a direction that depends upon the generator that is operated at the higher speed to develop the higher frequency. The rotation of this peak current value about the network can be understood, without presenting a quantitative analysis of the network, by first assuming that the generators are operating in synchronism, i. e. developing currents of the same frequency. The phase relation between the two generator outputs is therefore constant and there will be no rotation of current peak about the bridge network. The unidirectional currents developed by the rectifiers 7 therefore flow through the windings $8a$—$8c$ to establish a nonrotating magnetic field, and the permanent magnet 10 assumes a position that depends upon the phase relation of the identical-frequency output currents of the two generators.

A lack of synchronism will result in currents of different frequencies, and therefore of continuously varying phase relation, from the generators. It is obvious that this continuously varying phase relationship will result in a cyclic change in the magnitude of the resultant current flow in each bridge arm, and therefore in a rotation of the magnetic field established by the flow of rectified currents through the windings $8a$—$8c$. The permanent magnet 10 follows the rotating field and the travel of the pointer 11 thus indicates the generator that is driven at the higher speed, the angular speed of the pointer 11 being equal to the difference between the frequencies of the standard and the secondary generator.

Full-wave rectification is not essential for the production of the rotating field and the circuit may be simplified, as shown in Fig. 4, by connecting each instrument winding and a half-wave rectifier 7' in series with the associated resistor. The circuit elements corresponding to parts of the Fig. 1 circuit are identified by the same reference numerals. An additional element comprising an adjustable resistance 15 is shunted across the winding $8b$.

The half-wave rectification modifies the operation, as previously described, in that an unbalanced condition is established that results in a current flow in the inductive arm opposite the capacitive arm $6d$ that is substantially higher than the current flow in the other inductive arm. The magnitude of the current differential depends upon the values of the resistors $6a$—$6c$, and the effect of the current differential is to impart an exaggerated, jumpy rotation of the moving system towards the winding $8b$ that receives the heavier current. The number of turns of the winding $8b$ may be reduced to compensate for heavier current flow or, as indicated, the windings $8a$—$8c$ may be identical when the current flow to winding $8b$ is reduced by adjusting the shunt resistance 15.

The power for operating the indicating instrument is developed by the generators 1, 2 and may be of almost negligible magnitude when the instrument movement is supported on jewel or equivalent bearings that offer but little frictional resistance to angular movement. Practical embodiments of the invention have been constructed for operation on currents of the order of not more than 5 milliamperes, and it is possible to operate the synchroscope from the magnetos of an electrical tachometer system without affecting the tachometer indications by more than about 0.5%.

Simpler and cheaper constructions may be employed, as indicated in Figs. 5 and 6, when the generators 1, 2 develop sufficient power for the energization of small electric lamps. The indicating instrument and rectifier assemblies are omitted from the Fig. 5 apparatus, and lamps $16a$—$16d$ are included in the several side arms of the bridge network to indicate the magnitudes of the resultant currents in the several bridge arms. Synchronous operation of the generators 1, 2 is indicated by a non-flickering illumination of the several lamps, and the phase relation of the generators is indicated by the relative brilliance of the several lamps. Lack of synchronism is indicated by a cyclic variation in the brilliance of the lamps, and the direction of travel of the maximum illumination indicates the generator that is operating at the higher speed.

Only three indicating lamps could be employed in the Fig. 5 apparatus. This modification, and a further simplification of the circuit are shown in Fig. 6 in which the lamps 17a—17c constitute the resistive impedances of three of the side arms of the bridge. The circuit is otherwise like that shown in Fig. 5.

The bridge network for combining the outputs of the generators of a synchroscope to produce a rotating magnetic field is believed to be broadly new and it is to be understood that other devices may be employed to obtain a visual indication of the speed and direction of motion of the current about the bridge network. Various modifications that may occur to those skilled in the art fall within the spirit of my invention as set forth in the following claims.

I claim:

1. In a synchroscope for indicating the frequency and phase relations between the currents developed by two single phase alternating current generators, a bridge network having three side arms including one type of reactance and a fourth side arm including another type of reactance, the sets of opposed junction points of the network serving as input terminals for connection to the respective generators, and means responsive to the cyclic change in the magnitude of the current flow in the several side arms around the bridge network to indicate the speed and direction of motion of the current peak around the bridge network.

2. In a synchroscope, the invention as claimed in claim 1, wherein the said three side arms include resistors, and the fourth side arm comprises a condenser.

3. In a synchroscope to be energized by current components from two alternating current generators, the combination with a pivotally mounted permanent magnet, of means energized by current flow from said generators to develop a magnetic field in the region of said permanent magnet that rotates at a speed equal to difference in frequencies of the current outputs of the generators; said means comprising a bridge network across which said generators may be connected as the conjugate arms thereof, at least three side arms of the bridge network including windings spaced about said permanent magnet to develop a magnetic field that rotates when the current outputs of the generators are of different frequencies.

4. In a synchroscope, the combination with an indicating instrument comprising a pivotally mounted permanent magnet, and means including at least three circumferentially spaced windings to develop a magnetic field, of a bridge network having four side arms with sets of opposed junction points at which two single phase alternating currents may be introduced into the network, three of the side arms each including one of said windings and the fourth side arm being capacitive, whereby a rotating magnetic field is set up by said windings when the introduced currents differ in frequency, and rectifiers in three said side arms for supplying direct current to said windings of the instrument.

5. In a synchroscope, the invention as claimed in claim 4, wherein each of said rectifiers comprises a full-wave bridge assembly of copper oxide rectifiers.

6. In a synchroscope, the invention as claimed in claim 4, wherein each of said rectifiers is a half-wave copper oxide rectifier.

FREDERICK W. HORNBRUCH, Jr.